United States Patent [19]

Bouvier

[11] 4,227,717
[45] Oct. 14, 1980

[54] MOTORCYCLE SAFETY DEVICE

[76] Inventor: Julien J. Bouvier, 5600 S. Crain Hwy., Mitchellville, Md. 20716

[21] Appl. No.: 26,596

[22] Filed: Apr. 4, 1979

[51] Int. Cl.³ .............................................. B60R 21/02
[52] U.S. Cl. .................................. 280/753; 280/743; 280/730
[58] Field of Search .............. 280/728, 730, 743, 290, 280/289 G, 289 E, 753; 296/71

[56] References Cited

U.S. PATENT DOCUMENTS

| | | | |
|---|---|---|---|
| 3,146,460 | 9/1964 | Henderson | 2/2 |
| 3,473,824 | 10/1969 | Carey et al. | 280/729 |
| 3,623,768 | 11/1971 | Capener | 280/753 |
| 3,795,412 | 3/1974 | John | 280/730 |
| 3,902,740 | 9/1975 | Lucier et al. | 280/289 |
| 3,930,667 | 1/1976 | Osuchowski et al. | 280/730 |
| 4,059,852 | 11/1977 | Crane | 2/2 |

FOREIGN PATENT DOCUMENTS

| | | | |
|---|---|---|---|
| 2302648 | 7/1974 | Fed. Rep. of Germany | 280/728 |
| 2717234 | 11/1978 | Fed. Rep. of Germany | 280/730 |
| 85645 | 2/1957 | Netherlands | 280/290 |
| 1462125 | 1/1977 | United Kingdom | 280/730 |

Primary Examiner—John J. Love
Assistant Examiner—D. W. Underwood
Attorney, Agent, or Firm—Blair, Brown & Kreten

[57] ABSTRACT

Disclosed herein is a safety apparatus for use with a motorcycle to aid the rider in avoiding serious injuries due to collisions. An inflatable upwardly extending cocoon envelops the rider either upon impact, or upon his actuation thereof, and dissociates from the motorcycle to travel with the rider should he be thrown off. A housing is provided which unobtrusively rides on the motorcycle and nests the inflatable shroud so that a rider can be protected without having to don any supplemental gear.

4 Claims, 6 Drawing Figures

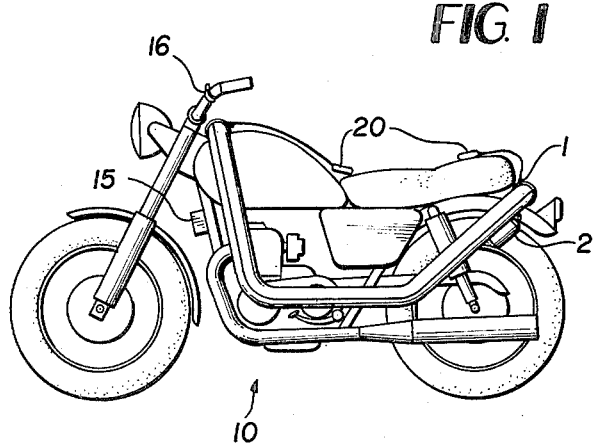
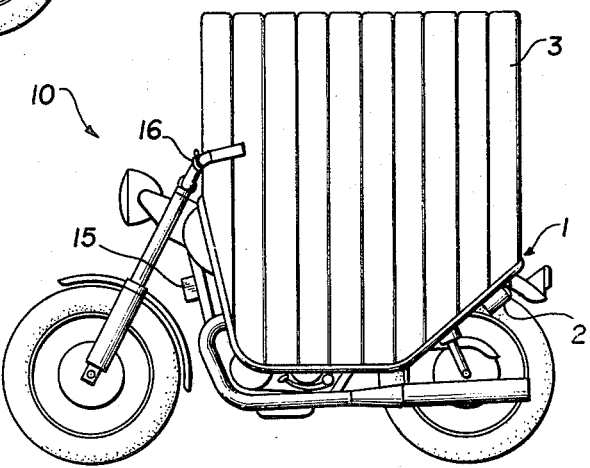
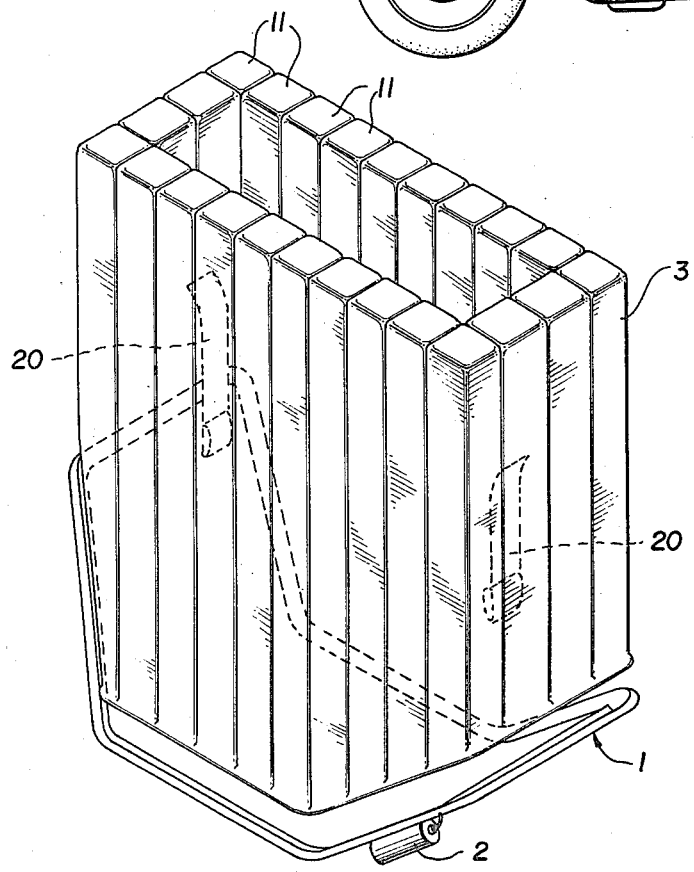

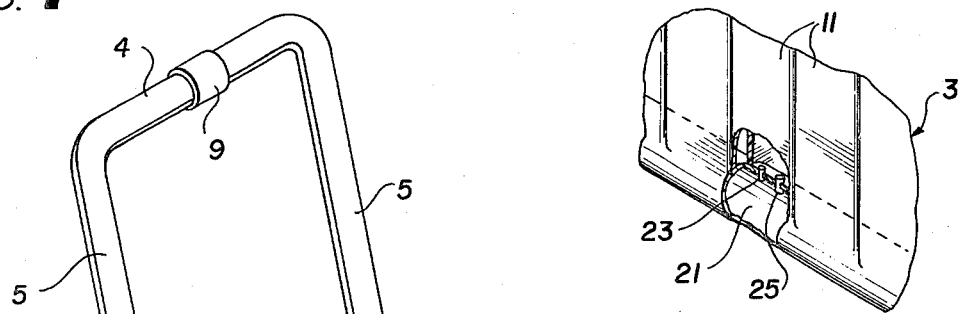
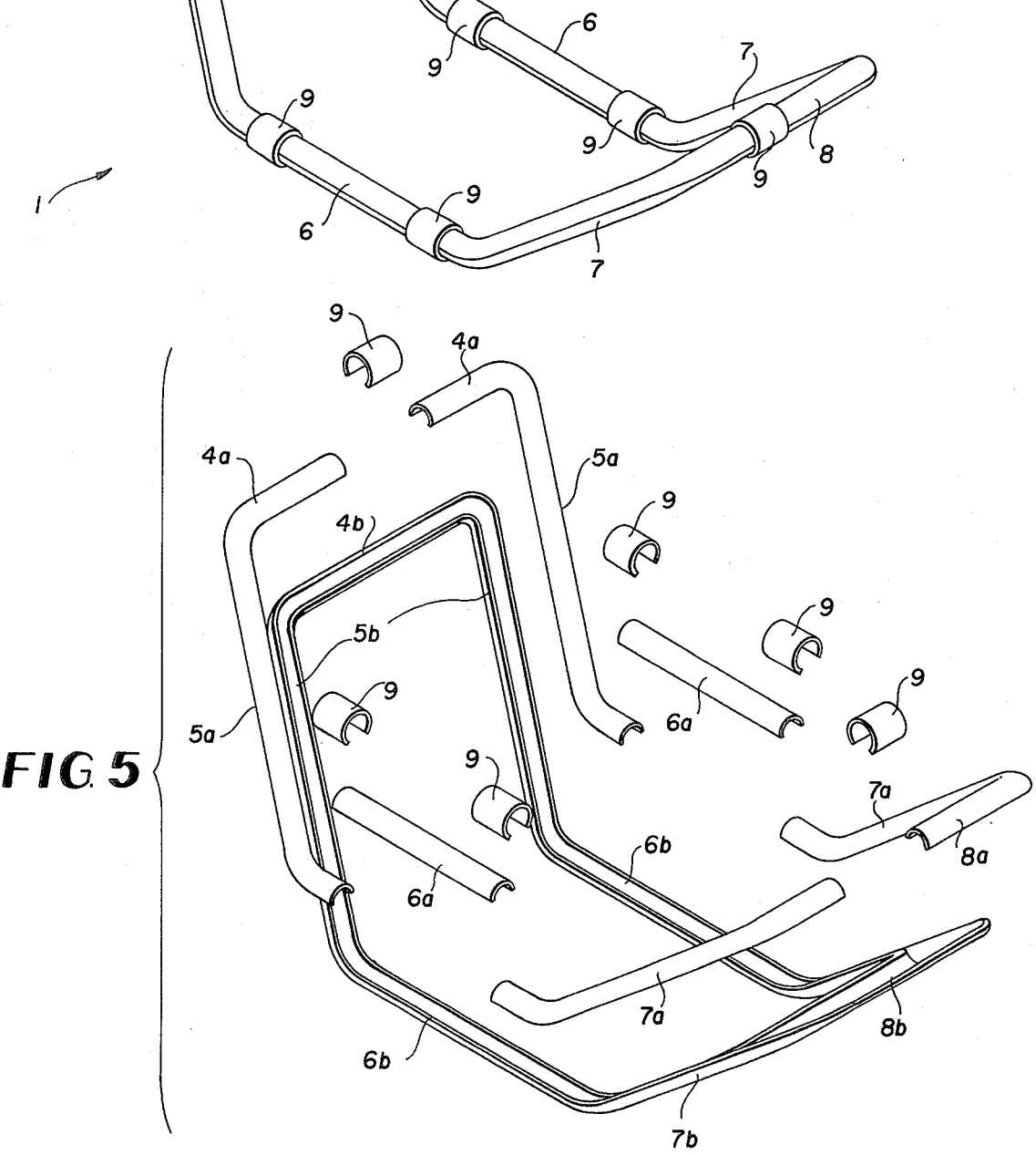

MOTORCYCLE SAFETY DEVICE

BACKGROUND OF THE INVENTION

Safety devices for motorcycles have been the subject of intense debate between motorcyclists, many of whom believe the degree of protective apparel which they must wear should be each individual's decision, and government agencies which require among other things helmets in order to help protect and reduce the severity of injuries to motorcyclists.

Prior art devices of which applicant is aware include the following five patents;

U.S. Pat. Nos. 3,930,667, 3,902,740, 3,146,460, 4,059,852, 3,473,824,

These devices can be characterized by noting that some of the suits are inflatable and attached to the vehicle by umbilical cords etc., but even the most cursory observation of these patents will reveal that most of these devices are not practical in temperate or tropical climates where motorcycling is most prevalent.

SUMMARY OF THE INVENTION

Accordingly, the ensuing detailed description of the invention contemplates providing a safety device for motorcycles in which the user of the motorcycle is not encumbered with articles of clothing intended to serve as protection.

A further object of this invention is to provide a safety device for motorcycles which is integral with or can be added to an existing motorcycle and carried thereon so as to obviate the necessity of a motorcyclist having to wear protective gear.

A further object contemplates providing a safety device for motorcycles which is actuated at the rider's discretion or alternatively upon sensing impact.

It is yet another object of this invention to provide a safety device for motorcyclists which is durable in construction, easily deployed, and reliable in service.

These and other objects will be made manifest when considering the ensuing detailed specification and claims.

BRIEF DESCRIPTION OF THE DRAWINGS

FIG. 1 shows the apparatus according to the present invention in a retracted position;

FIG. 2 shows the apparatus in the deployed mode;

FIG. 3 shows the safety device in perspective remote and removed from the motorcycle;

FIG. 4 shows the frame work that houses the safety device when same is retracted;

FIG. 5 is an exploded parts view of the housing for the safety device; and

FIG. 6 is a cutaway view of the air passageway connecting various cocoon elements with appropriate valving.

BRIEF DESCRIPTION OF THE PREFERRED EMBODIMENT

Referring to the drawings now, wherein like reference numerals refer to like parts throughout the several drawing figures, reference numeral 10 is directed to the safety device according to the present invention. The device 10 can generally be regarded as being provided with a framework 1 within which an inflatable cocoon 3 is housed when in storage.

The cocoon 3 is comprised in a preferred form of the invention of a plurality of elongate rectanguloid sections 11 which when extended has its longitudinal axis vertically oriented, and each of these sections 11 is placed in juxtaposition so that the ensuing cocoon developes or generates a substantially rectangular wall having a hollow central area. The structure 1 within which the cocoon 3 is nested can now be defined. The frame structure 1 can generally be regarded as having a splayed U-shaped configuration defined by a bottom section 6 disposed on opposed sides of the motorcycle, an angulated forwardly upstanding frame member 5 similarily oriented on both sides, and an interconnected brace 4 disposed on the top of the motorcycle proximate to the gas tank, but rearward of the steering forks so that the maneuverability of the motorcycle is not impaired. The rear section is similarly angled as at 7 but the degree of angulation can be varied to accommodate motorcycles of different configurations. These two rear sections 7 are interconnected by a cross bar 8 which terminates just behind the seat of the motorcycle so that the entire riding area can be protected.

A plurality of resilient semi-cylindrical rings 9 are provided along the frame 1 to secure and fasten the top and bottom portions of the frame, the top portions thereof bearing the reference numeral A (FIG. 5) and the bottom portions B. Depending from the bottom face of the frame is at least one air canister 2 provided with compressed air and allowed to communicate with the bottom edge of the cocoon so that upon actuation thereof, compressed air is allowed to inflate the cocoon in an extremely rapid fashion. The bottom terminus of the cocoon can therefore be disassociated from the motorcycle and will envelop the motorcyclist so that should the motorcyclist be throw off the motorcycle, the cocoon will protect the rider from abrasions and will attenuate any blows that the motorcyclist may receive from engaging obstructions. Appropriate valving provides ingress 25 and egress 23 of air as desired, as shown in FIG. 6, served by common chamber 21.

At least one tether 20 (and preferably two, one forward and one rearward) extends from a substantially medial portion of an inner face of the cocoon to the rider(s) to assure that the rider(s) will remain within this protective device once it is energized.

The cocoon is preferably made from a synthetic plastic which may or may not be reinforced with fabric so as to improve its durability. When the canister is energized, the retention clips 9 disassociate from the frame 1 and the top portions of the frame pop off under the impetus of the expanding inflating cocoon which envelops the motorcyclist.

Actuation of cocoon can occur through impact sensing device 15 or manual actuator 16. Plural sections 11 are preferred to a single cell so that abrading one section will not cause the entire cocoon to deflate.

Having thus described the invention, it should be apparent that numerous structural modifications are contemplated as being a part of this invention as set forth hereinabove and as delineated hereinbelow by the claims.

I claim:

1. A safety device for a motorcycle comprising, in combination, a frame having releasably interconnected portions mounted on the motorcycle, said frame completely surrounding a rider seated on the motorcycle, an inflatable cocoon disposed within said frame, a source of pressurized air connected to said cocoon, means for activating said source of pressurized air to inflate said cocoon and release said interconnected portions of said frame whereby said cocoon in the inflated condition completely surrounds said rider for protection against injuries.

2. A safety device for a motorcycle comprising, in combination, frame means disposed on the motorcycle, said frame means including a splayed U-shaped structure disposed on opposed sides of the motorcycle and an interconnecting cross bar at a front and rear portion thereof and spring clip elements to retain top and bottom portions of said frame means, inflatable means disposed within said frame means which when actuated envelops a motorcyclist and protects him from injuries, said inflatable means including an inflatable cocoon which when initialized resides within said frame means and which when activated extends up and around the motorcyclist, at least one air cannister affixed to said frame means and oriented so as to inflate said cocoon whereby when said air cannister is energized, said spring clip elements pop off said frame means and the top portion of said frame means is disassociated therefrom and said cocoon is allowed to expand.

3. The device of claim 2 in which said cocoon is comprised of a plurality of elongate rectanguloid cells juxtaposed so as to define a rectangular periphery having a central void within which the rider is contained.

4. The device of claim 2 including tether means connecting a rider to said inflatable means to assure that the rider will remain within the inflatable means once it is energized.

* * * * *